(12) United States Patent
Iwanami

(10) Patent No.: US 11,449,148 B2
(45) Date of Patent: *Sep. 20, 2022

(54) COMMUNICATION SYSTEM, SERVER, STORAGE MEDIUM, AND COMMUNICATION CONTROL METHOD

(71) Applicant: SONY CORPORATION, Tokyo (JP)

(72) Inventor: Hiroshi Iwanami, Tokyo (JP)

(73) Assignee: SONY CORPORATION, Tokyo (JM)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,749

(22) Filed: Jan. 6, 2021

(65) Prior Publication Data
US 2021/0124426 A1    Apr. 29, 2021

Related U.S. Application Data

(63) Continuation of application No. 15/769,561, filed as application No. PCT/JP2016/073202 on Aug. 5, 2016, now Pat. No. 10,915,178.

(30) Foreign Application Priority Data

Nov. 11, 2015    (JP) ................................. 2015-221161

(51) Int. Cl.
*G06F 3/01*    (2006.01)
*G06F 13/00*    (2006.01)
(Continued)

(52) U.S. Cl.
CPC ................ *G06F 3/017* (2013.01); *G06F 3/01* (2013.01); *G06F 3/16* (2013.01); *G06F 13/00* (2013.01);
(Continued)

(58) Field of Classification Search
None
See application file for complete search history.

(56) References Cited

U.S. PATENT DOCUMENTS 5,914,701 A * 6/1999 Gersheneld ............. G06F 3/017
345/156
8,552,983 B2 * 10/2013 Chiu ....................... G06F 3/017
704/275
(Continued)

FOREIGN PATENT DOCUMENTS

EP    2797015 A1    10/2014
JP    2004-297598 A    10/2004
(Continued)

OTHER PUBLICATIONS

Office Action for JP Patent Application No. 2017-549998, dated Apr. 7, 2020, 04 pages of Office Action and 03 pages of English Translation.

(Continued)

*Primary Examiner* — Tuan S Nguyen
(74) *Attorney, Agent, or Firm* — Chip Law Group

(57) ABSTRACT

Provided is a communication system that includes a recognition unit that recognizes whether a user is performing a specific gesture, and a control unit that identifies a client serving as a communication destination, when the specific gesture is recognized. The control unit further identifies an impression represented by the recognized gesture information and performs control such that the impression represented by the gesture information is notified to a user corresponding to the client.

12 Claims, 15 Drawing Sheets

(51) Int. Cl.
  *H04L 67/125*  (2022.01)
  *H04L 67/50*  (2022.01)
  *G06F 3/16*  (2006.01)
  *H04W 4/02*  (2018.01)
  *H04M 3/42*  (2006.01)
  *H04L 67/01*  (2022.01)
  *H04W 4/12*  (2009.01)

(52) U.S. Cl.
  CPC .......... *H04L 67/125* (2013.01); *H04L 67/535* (2022.05); *H04W 4/023* (2013.01); *H04L 67/01* (2022.05); *H04M 3/42382* (2013.01); *H04W 4/026* (2013.01); *H04W 4/12* (2013.01)

(56) References Cited

U.S. PATENT DOCUMENTS

| | | | |
|---|---|---|---|
| 2013/0227411 A1* | 8/2013 | Das | H04M 19/047 715/702 |
| 2014/0059500 A1 | 2/2014 | Kanno | |
| 2014/0188989 A1* | 7/2014 | Stekkelpak | H04L 67/02 709/204 |
| 2015/0042623 A1 | 2/2015 | Kato | |
| 2015/0123775 A1 | 5/2015 | Kerdemelidis | |
| 2015/0172404 A1* | 6/2015 | Sathish | H04L 67/06 709/217 |
| 2015/0269936 A1* | 9/2015 | Alameh | G10L 15/26 704/235 |
| 2016/0085437 A1 | 3/2016 | Hamara et al. | |

FOREIGN PATENT DOCUMENTS

| | | |
|---|---|---|
| JP | 2006-003451 A | 1/2006 |
| JP | 2008-126954 A | 6/2008 |
| JP | 2010-225143 A | 10/2010 |
| JP | 2010-537300 A | 12/2010 |
| JP | 2013-513294 A | 4/2013 |
| JP | 2013-178631 A | 9/2013 |
| JP | 2013-251913 A | 12/2013 |

OTHER PUBLICATIONS

International Search Report and Written Opinion of PCT Application No. PCT/JP2016/073202, dated Aug. 30, 2016, 08 pages of English Translation and 07 pages of ISRWO.

International Preliminary Report on Patentability of PCT Application No. PCT/JP2016/073202, dated May 24, 2018, 08 pages of English Translation and 04 pages of IPRP.

Non-Final Office Action for U.S. Appl. No. 15/769,561, dated Sep. 16, 2019, 16 pages.

Non-Final Office Action for U.S. Appl. No. 15/769,561, dated Jun. 22, 2020, 16 pages.

Final Office Action for U.S. Appl. No. 15/769,561, dated Feb. 10, 2020, 15 pages.

Advisory Action for U.S. Appl. No. 15/769,561, dated Apr. 20, 2020, 03 pages.

Notice of Allowance for U.S. Appl. No. 15/769,561, dated Oct. 9, 2020, 06 pages.

Office Action for JP Patent Application No. 2020-115002, dated May 11, 2021, 05 pages of English Translation and 05 pages of Office Action.

* cited by examiner

FIG.9
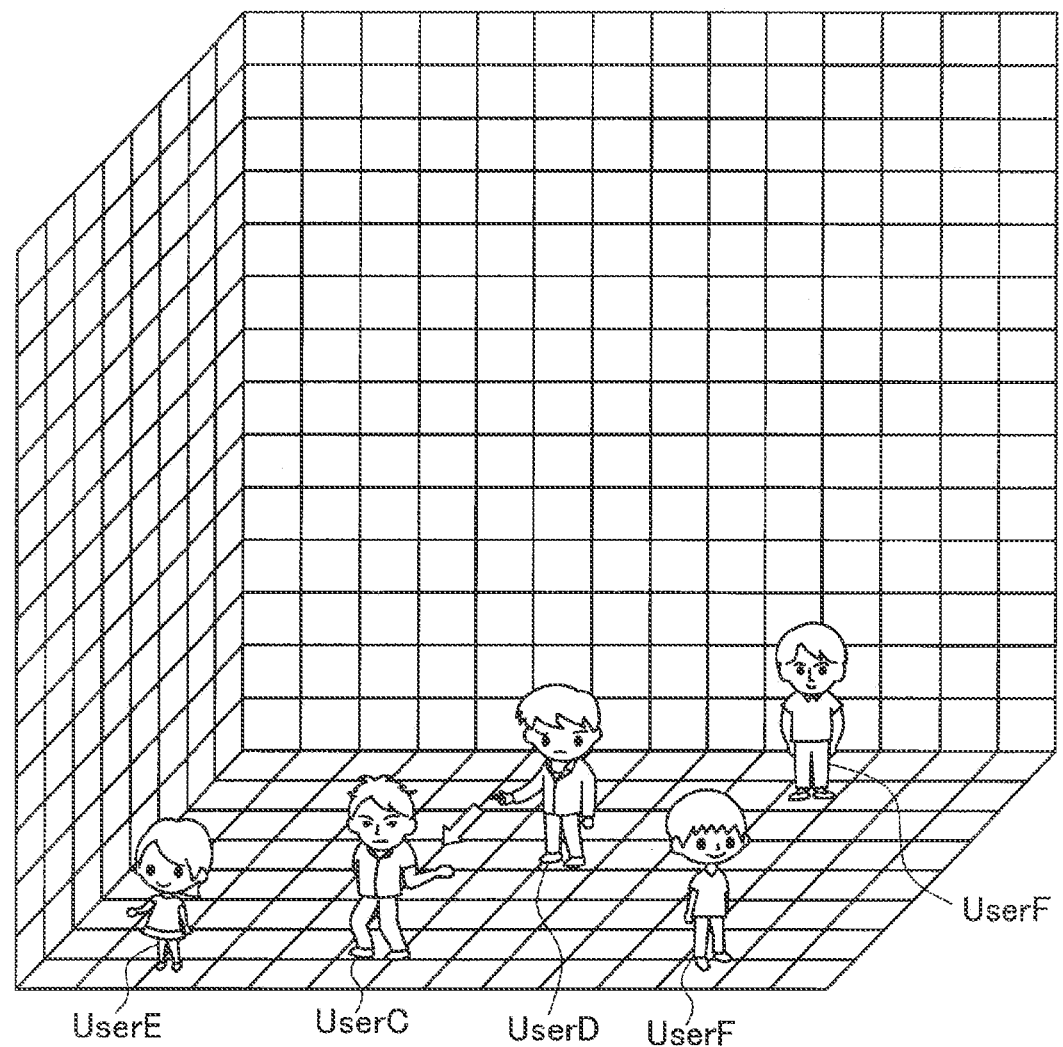
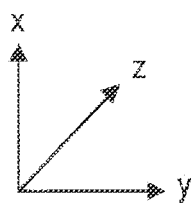

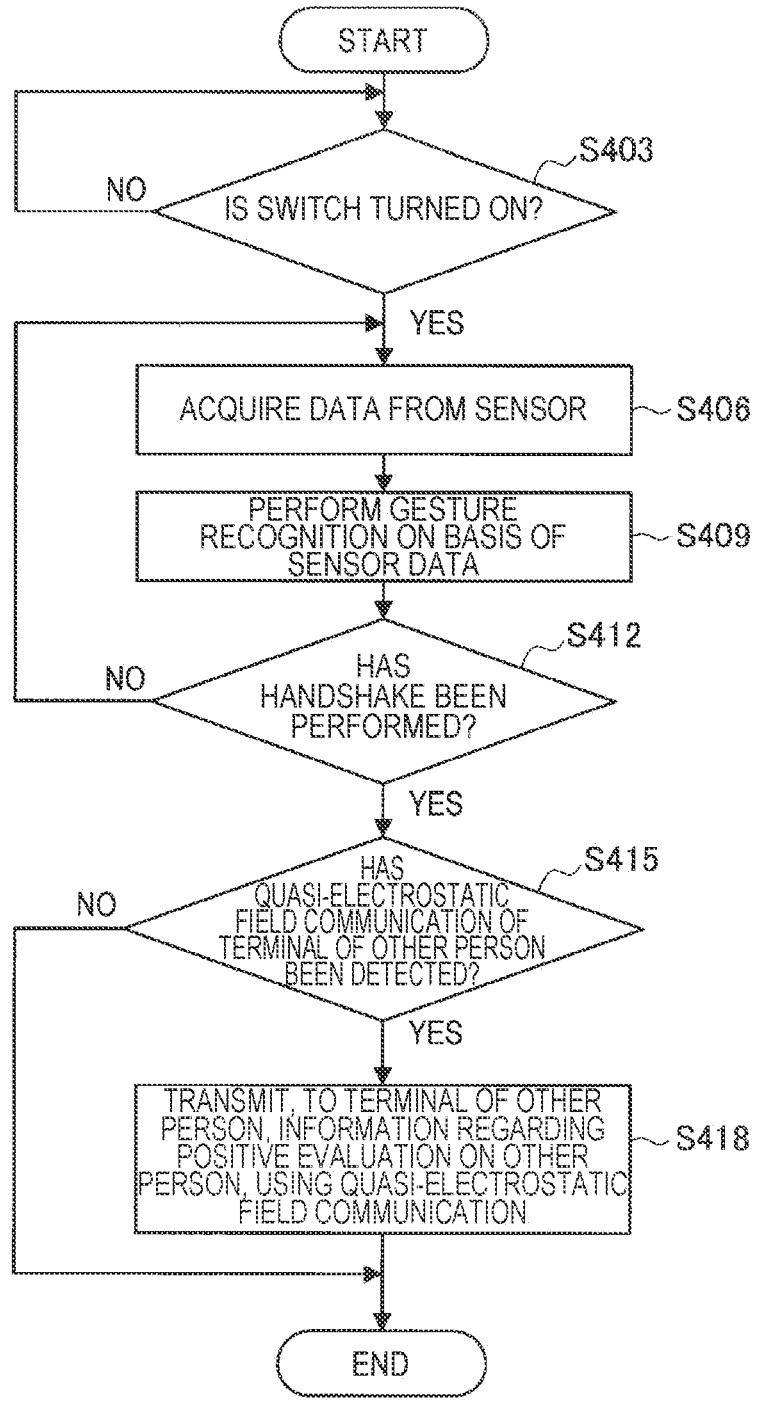

COMMUNICATION SYSTEM, SERVER, STORAGE MEDIUM, AND COMMUNICATION CONTROL METHOD

CROSS-REFERENCES TO RELATED APPLICATIONS

The present application is a continuation application of U.S. patent application Ser. No. 15/769,561, filed on Apr. 19, 2018, which is a National Stage Entry of PCT/JP2016/073202 filed on Aug. 5, 2016, which claims priority benefit of Japanese Patent Application No. JP 2015-221161, filed in the Japan Patent Office on Nov. 11, 2015. Each of the above-referenced applications is hereby incorporated herein by reference in its entirety.

TECHNICAL FIELD

The present disclosure relates to a communication system, a server, a storage medium, and a communication control method.

BACKGROUND ART

In daily life, there frequently occurs a situation in which thought is desired to be conveyed to other person.

For example, the following Patent Literature 1 discloses an event trend analysis system in which, in a case where words of a certain object person makes an impression, when an intention conveyance switch is pressed with a directional microphone being directed toward the object person, object person information regarding a user impression of the object person is created.

CITATION LIST

Patent Literature

Patent Literature 1:
JP 2006-003451A

DISCLOSURE OF INVENTION

Technical Problem

Nevertheless, for example, even if a person notices a young person offering his/her seat to an elderly person in a crowded car, feels admiration for the young person, and desires to make a compliment to the young person, it is difficult to address a stranger. In addition, in a case where a person feels uncomfortable directly addressing another person who is doing a good deed, if the person thinks about sending a message by e-mail or a social network service (SNS), in some cases, the person does not know an e-mail address of the other person, or feels bothersome to input a message.

In this manner, even if there frequently occurs in daily life a situation in which thought of oneself is desired to be conveyed even to a stranger aside from friends and acquaintances, there has been no optimum method that can easily convey the thought. In view of the foregoing, the present disclosure proposes a communication system, a server, a storage medium, and a communication control method that can notify an impression to a specific other person by means of gestures.

Solution to Problem

According to the present disclosure, there is provided a communication system including: a recognition unit configured to recognize whether a user is performing a specific gesture; and a control unit configured to identify a client serving as a communication destination, when the specific gesture is recognized, identify an impression represented by the recognized gesture information, and perform control such that the impression represented by the gesture information is notified to a user corresponding to the client.

According to the present disclosure, there is provided a server including: a communication unit configured to receive, from a plurality of clients, position information indicating respective positions; and a control unit configured to when gesture information indicating that a user corresponding to a specific client is performing a specific gesture, and direction information of a gesture are received via the communication unit, identifies a client pointed out by the user, in accordance with the position information corresponding to a client that has transmitted the gesture information, and the direction information that have been acquired via the communication unit, and performs control such that an impression represented by the gesture information is notified to a user corresponding to the client.

According to the present disclosure, there is provided a storage medium storing a program for causing a computer to function as: a recognition unit configured to recognize whether a user is performing a specific gesture; and a control unit configured to identify a client serving as a communication destination, when the specific gesture is recognized, identify an impression represented by the recognized gesture information, and perform control such that the impression represented by the gesture information is notified to a user corresponding to the client.

According to the present disclosure, there is provided a communication control method including: by a processor, receiving, from a plurality of clients, position information indicating respective positions via a communication unit; when gesture information indicating that a user corresponding to a specific client is performing a specific gesture, and direction information of a gesture are received via the communication unit; identifying a client pointed out by the user, in accordance with the position information corresponding to a client that has transmitted the gesture information, and the direction information that have been acquired via the communication unit; and performing control such that an impression represented by the gesture information is notified to a user corresponding to the client.

Advantageous Effects of Invention

As described above, according to the present disclosure, an impression can be notified to a specific other person by means of gestures.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is a diagram that describes an identification method of an object person according to the first example.

FIG. 15 is a flow chart illustrating operation processing of the wearable terminal according to the application example of the present embodiment.

MODE(S) FOR CARRYING OUT THE INVENTION

Figure 1:
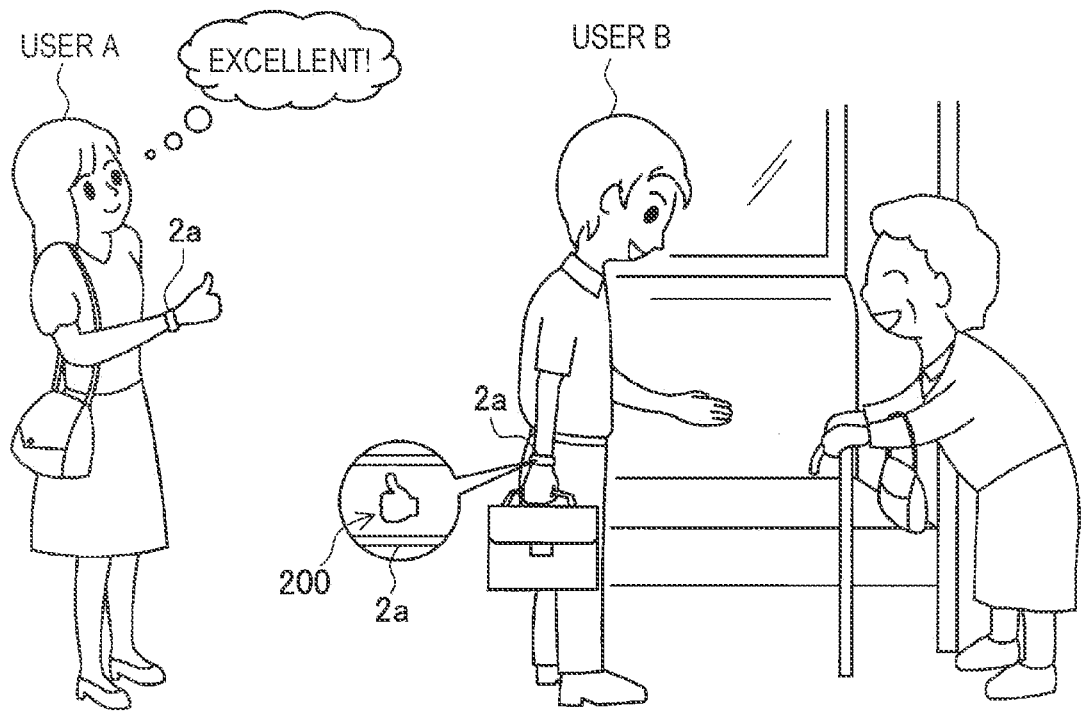
FIG. 1 is a diagram that describes an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be given in the following order.

1. Overview of Information Processing System According to Embodiment of Present Disclosure
2. Configuration
2-1. Configuration of User Terminal
2-2. Configuration of Wearable Terminal
2-3. Configuration of Server
3. Operation Processing
3-1. First Example
3-2. Second Example
3-3. Third Example
4. Application Example
5. Conclusion 1. Overview of Information Processing System According to Embodiment of Present Disclosure An information processing system according to the present embodiment enables an impression to be notified to a specific other person by means of gestures. As mentioned above, in daily life, in a case where a person notices another person who is doing a good deed or a bad deed, the person desires to make a compliment or give warning to the other person, but it is difficult to suddenly address a stranger. In view of the foregoing, in the present embodiment, when it is detected that a specific gesture has been performed, other person to which a user has directed the gesture is recognized, a good evaluation or a bad evaluation is notified, and furthermore, a message associated with the gesture is notified. The user can thereby easily convey a feeling of the user to the other person.

FIG. 1 is a diagram that describes an overview of an information processing system according to an embodiment of the present disclosure. As illustrated in FIG. 1, for example, in a case where a user A notices a young person offering his seat to an elderly person in a crowded car, feels admiration for the young person, and desires to make a compliment to or make a good evaluation on the young person (a user B), as illustrated in FIG. 1, the user A performs a gesture of showing a fist with thumb up toward the user B.

When the gesture of the user A is detected by a worn wearable terminal 2a, and recognized as a specific gesture, the information processing system according to the present embodiment identifies, on the basis of a position of the user A, and a direction to which the gesture is directed, the user B existing in the direction to which the gesture is directed, as other person.

Then, an impression corresponding to the gesture shown by the user A is notified to the identified user. More specifically, as illustrated in FIG. 1, an icon indicating an evaluation of "Good" is displayed on a display unit of the wearable terminal 2a worn by the user B, and an evaluation point is accumulated. The user A can thereby easily convey a feeling only by performing a gesture to a person to which thought is desired to be conveyed. In addition, when the user B has performed a good deed, the user B can recognize that a favorable feeling has been sent from a peripheral person, and have a warm feeling. On the other hand, even to a bad-mannered person, a warning feeling and a negative evaluation can be conveyed without constraint only by performing a gesture. A person who has received a bad evaluation is expected to realize that the person is seen by a periphery, and make an effort to enhance a manner.

Here, an example of specific examples of impressions corresponding to gestures according to the present embodiment is listed below.

TABLE 1

| Gesture | Impression |
| --- | --- |
| Shooting with a finger pistol | Anger, No |
| Warning operation performed by a referee in a sport match | Forbiddance, No |
| Sign of cutting a throat with thumb up | Firing, Dismissal, Anger |
| Showing a fist with thumb down | No Good |
| Giving a look | Signal, Desire to be noticed |
| Wink | Affection, Response |
| Throwing a kiss | Affection, Dearness, Love |
| Sign of issuing a red card | Forbiddance, No |
| Showing a direction by largely swinging a right hand | Over there, Please go there! |
| Hand beckoning | Come here |
| Make a circle with fingers (OK sign) | Okay |
| Pointing a finger | Indicate a target object or a direction |
| Showing a fist with thumb up | Good, Excellent, Make a compliment |

In addition, in a case where other person exists in proximity, a gesture involving a direct body contact can occur in addition to a normal gesture. Specific examples are listed below.

TABLE 2

| Gesture | Impression |
| --- | --- |
| Handshake | Nice to meet you |
| Hug | Dearness, Gladness |
| Massaging shoulders | Thank, Back-pat |
| Slipping an arm around a waist | Dearness |
| Hug and tapping a back | Good job, Well done |
| High touch | Delight, Great! |

Figure 2:
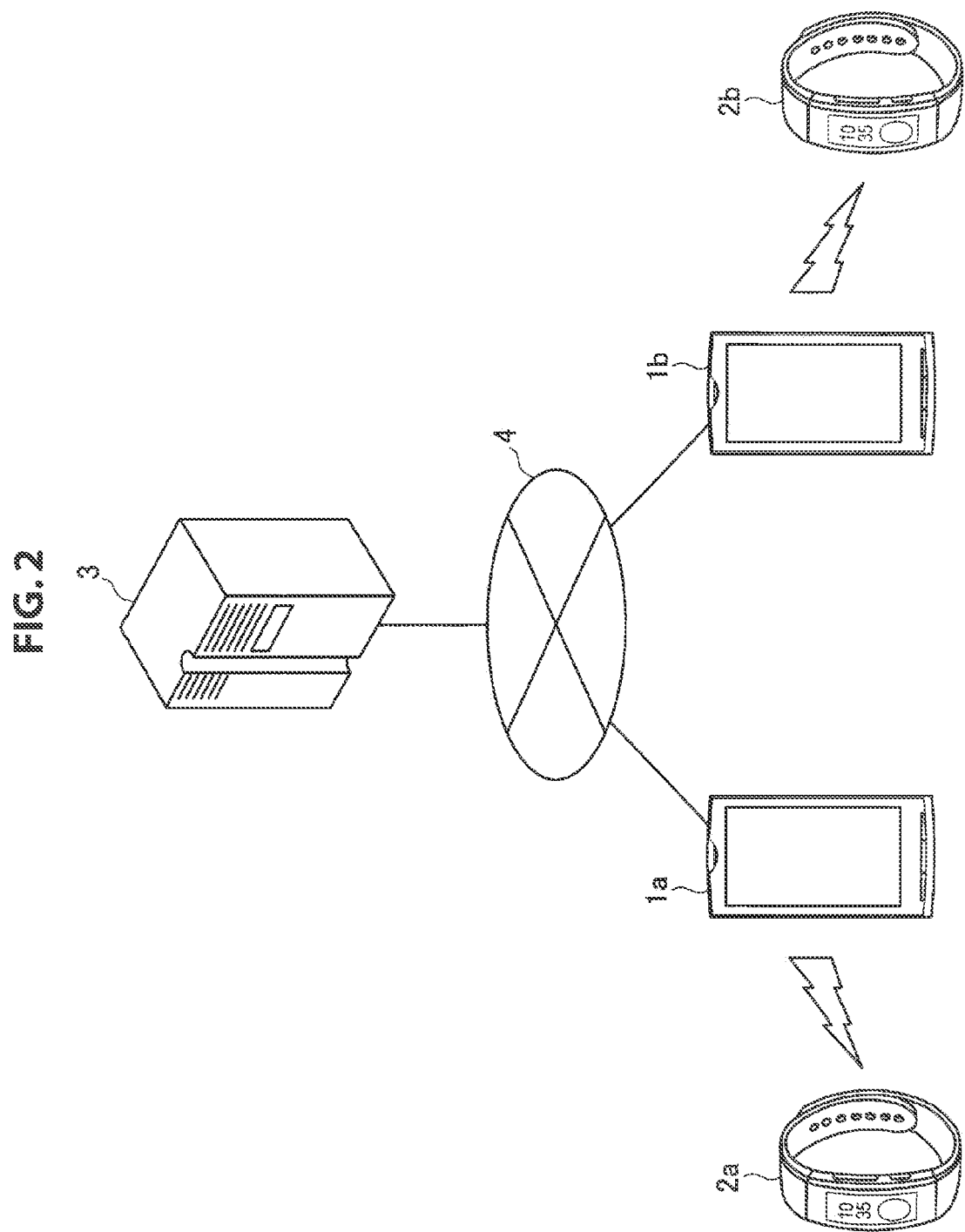
FIG. 2 is a configuration diagram of an information processing system according to an embodiment of the present disclosure.

Next, an overall configuration of the aforementioned information processing system according to the present embodiment will be described. FIG. 2 is a configuration diagram of an information processing system according to an embodiment of the present disclosure. As illustrated in FIG. 2, the information processing system according to the present embodiment includes user terminals 1 (1a, 1b), wearable terminals 2 (2a, 2b), and a server 3. The server 3 connects with the user terminals 1 via a network 4, and performs transmission and reception of data.

The wearable terminals 2 include various sensors such as an acceleration sensor, a direction sensor, and a beat sensor, and perform gesture recognition on the basis of sensor data. Recognized gesture information is transmitted to the user terminals 1.

The user terminals 1 connect with the wearable terminals 2 via Near Field Communication such as Bluetooth (Registered Trademark) or Wi-Fi (Registered Trademark), and receive gesture information, sensor data, and the like. In addition, the user terminals 1 transmit gesture information and position information of the own devices to the server 3 via the network 4.

The server 3 searches for and identifies the position information and the gesture information that have been transmitted from the user terminal 1a, and a person existing in a direction to which a gesture is directed from a position of a user, from another user terminal 1. Then, the server 3 notifies an impression corresponding to the gesture, to the identified person.

2. Configuration

2-1. Configuration of User Terminal

Figure 3:
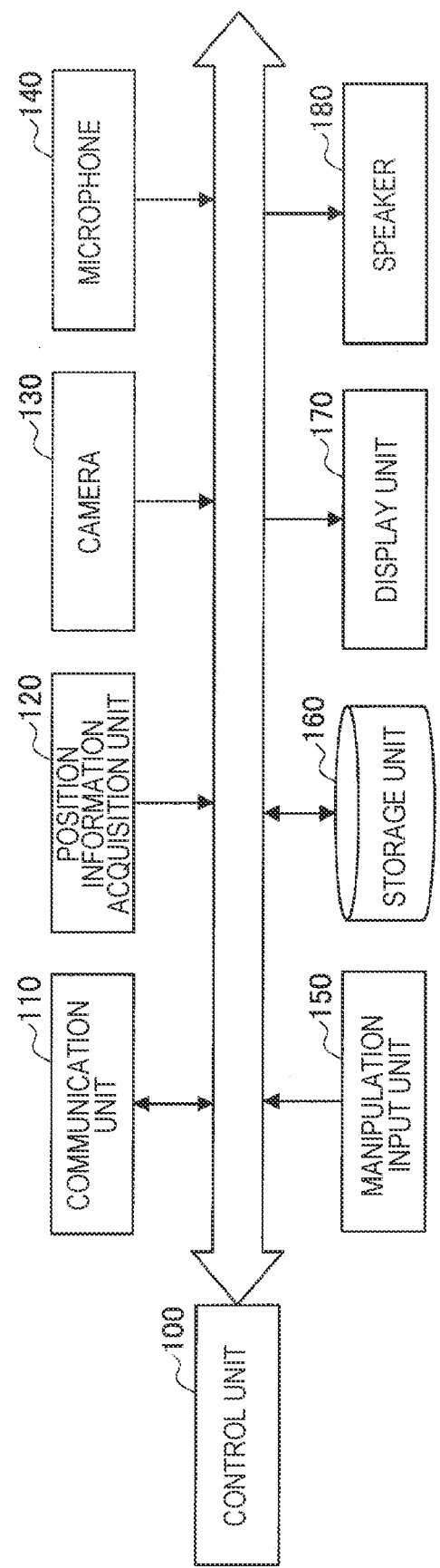
FIG. 3 is a block diagram illustrating a configuration example of a user terminal according to the present embodiment.

FIG. 3 is a block diagram illustrating a configuration example of the user terminal 1 according to the present embodiment. As illustrated in FIG. 3, the user terminal 1 includes a control unit 100, a communication unit 110, a position information acquisition unit 120, a camera 130, a microphone 140, a manipulation input unit 150, a storage unit 160, a display unit 170, and a speaker 180.

The control unit 100 functions as an arithmetic processing device and a control device, and controls the entire operation performed inside the user terminal 1, in accordance with various programs. The control unit 100 is implemented by an electronic circuit such as a central processing unit (CPU) and a microprocessor, for example.

The communication unit 110 performs transmission and reception of data with an external device in a wired/wireless manner. More specifically, for example, the communication unit 110 can perform communication with a cloud (the server 3) by communication with a public line network, and in addition, can perform communication with an wearable terminal using Wi-Fi communication, Bluetooth communication, or the like.

The position information acquisition unit 120 has a function of acquiring position information of the user terminal 1. For example, the position information acquisition unit 120 may be a Global Positioning System (GPS) antenna, and a GPS processing unit that processes a GPS signal received by the GPS antenna. Alternatively, the position information acquisition unit 120 may be a Wi-Fi antenna that receives Wi-Fi (Registered Trademark) radio waves from a plurality of base stations, and a position calculation unit that estimates a distance from each base station from reception intensity of the received Wi-Fi radio waves, and calculates a current position on the basis of a principle of triangulation, using a distance from each base station and a position of each base station.

The camera 130 captures an image of a periphery in accordance with a user manipulation, and outputs the captured image information to the control unit 100.

The microphone 140 collects a sound in a periphery in accordance with a user manipulation, and outputs the collected sound information to the control unit 100.

The manipulation input unit 150 is implemented by a touch panel, a switch, a button, or the like, detects a manipulation input performed by a user, and outputs a detected input signal to the control unit 100.

The storage unit 160 is implemented by a read only memory (ROM) that stores a program, a calculation parameter, and the like that are used in processing of the control unit 100, and a random access memory (RAM) that temporarily stores a parameter or the like that appropriately varies.

The display unit 170 is an example of an output unit, and is implemented by a display device such as a liquid crystal display (LCD) device and an organic EL (OLED: Organic Light Emitting Diode) display device.

The speaker 180 is an example of an output unit, and reproduces a sound signal.

2-2. Configuration of Wearable Terminal

Figure 4:
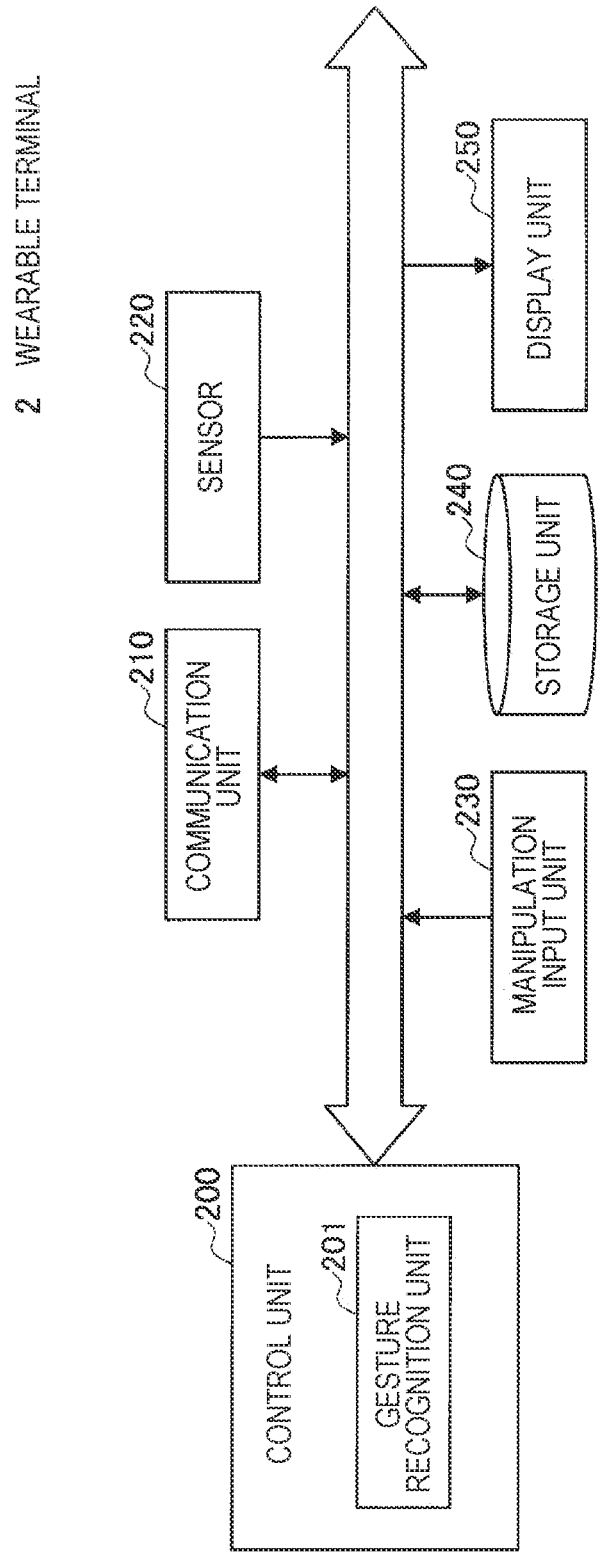
FIG. 4 is a block diagram illustrating a configuration example of an wearable terminal according to the present embodiment.

FIG. 4 is a block diagram illustrating a configuration example of the wearable terminal 2 according to the present embodiment. As illustrated in FIG. 4, the wearable terminal 2 includes a control unit 200, a communication unit 210, a sensor 220, a manipulation input unit 230, a storage unit 240, and a display unit 250.

The control unit 200 functions as an arithmetic processing device and a control device, and controls the entire operation performed inside the wearable terminal 2, in accordance with various programs. The control unit 100 is implemented by an electronic circuit such as a CPU and a microprocessor, for example.

In addition, the control unit 200 also functions as a gesture recognition unit 201. On the basis of sensor data detected by the sensor 220, the gesture recognition unit 201 analyzes an operation of the user, and recognizes a gesture.

The communication unit 210 performs transmission and reception of data with an external device in a wired/wireless manner. More specifically, for example, the communication unit 210 can perform communication with the user terminal 1 using Wi-Fi communication, Bluetooth communication, or the like.

The sensor 220 corresponds to various sensors for recognizing a gesture of the user, and includes, for example, an acceleration sensor, a gyro sensor, a compass (direction sensor), a myoelectric sensor, a vibration sensor, a beat sensor, a microphone, or the like.

The manipulation input unit 230 is implemented by a switch, a button, or the like, detects a manipulation input performed by the user, and outputs a detected input signal to the control unit 200.

The storage unit 240 is implemented by a ROM that stores a program, a calculation parameter, and the like that are used in processing of the control unit 200, and a RAM that temporarily stores a parameter or the like that appropriately varies.

The display unit 250 is an example of an output unit, and is implemented by a display device such as a liquid crystal display (LCD) device and an organic EL (OLED: Organic Light Emitting Diode) display device. Note that the wearable terminal 2 may be further provided with a light-emitting unit (indicator), a vibration unit (e.g., vibration motor), or the like, as another output unit.

2-3. Configuration of Server

Figure 5:
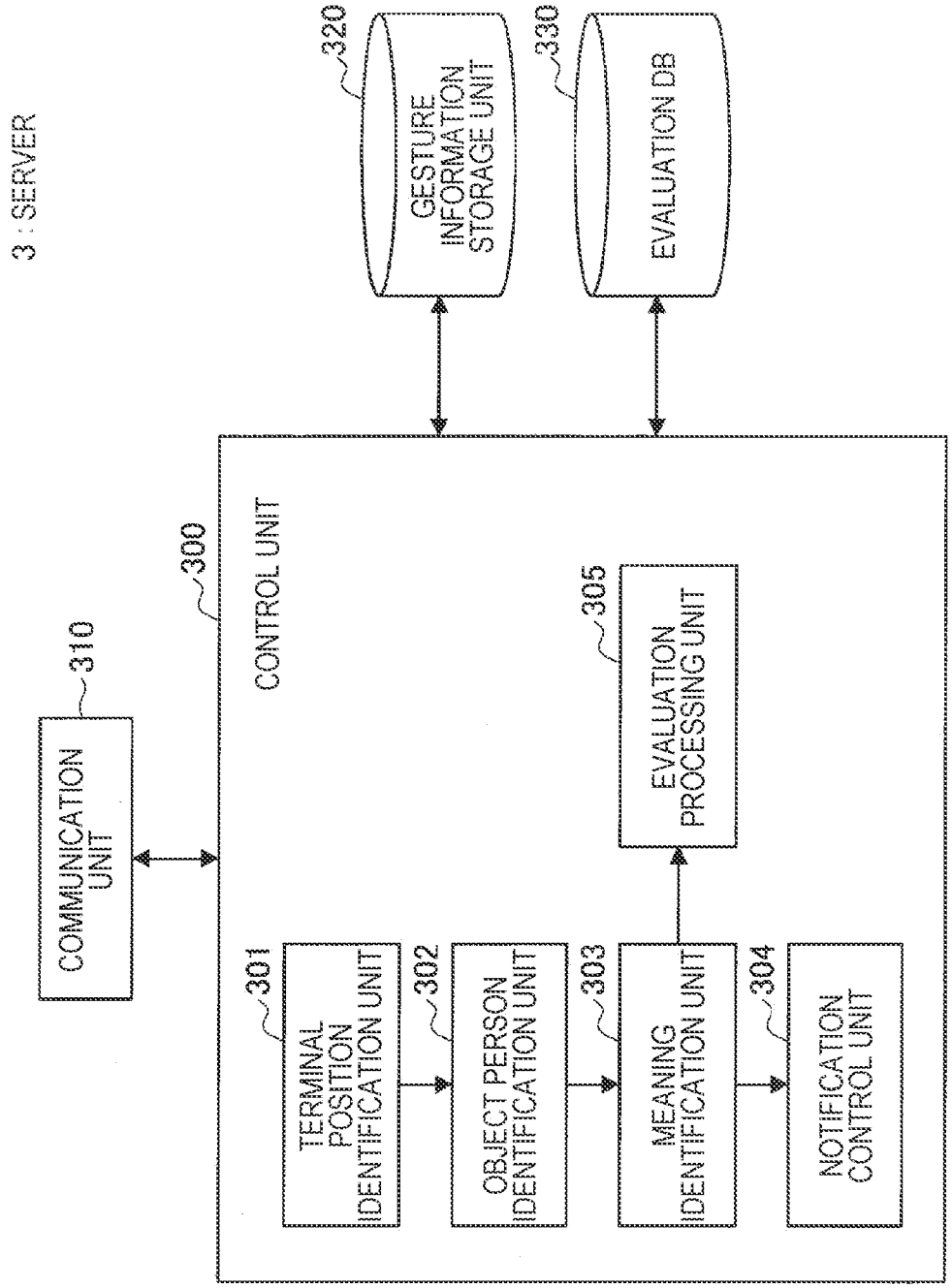
FIG. 5 is a block diagram illustrating a configuration example of a server according to the present embodiment.

FIG. 5 is a block diagram illustrating a configuration example of the server 3 according to the present embodiment. As illustrated in FIG. 5, the server 3 includes a control unit 300, a communication unit 310, a gesture information storage unit 320, and an evaluation database (DB) 330.

The control unit 300 functions as an arithmetic processing device and a control device, and controls the entire operation performed inside the server 3, in accordance with various programs. The control unit 300 is implemented by an electronic circuit such as a CPU and a microprocessor, for example. In addition, the control unit 300 functions as a terminal position identification unit 301, an object person identification unit 302, a meaning identification unit 303, a notification control unit 304, and an evaluation processing unit 305.

The terminal position identification unit 301 identifies a position of the user terminal 1 that has transmitted gesture information. For example, the terminal position identification unit 301 identifies a terminal position on the basis of position information that has been transmitted from the user terminal 1 together with the gesture information.

On the basis of the gesture information and the terminal position, the object person identification unit 302 identifies other person regarded as a target of the gesture. For example, the object person identification unit 302 can identify a position of a person to which the user has directed the gesture, on the basis of direction sensor data added to the gesture information, and current position information pieces of a large number of user terminals 1.

The meaning identification unit 303 refers to the gesture information storage unit 320, to identify an impression corresponding to the gesture transmitted from the user terminal 1.

The notification control unit 304 performs control so that an impression of the gesture that has been identified by the meaning identification unit 303 is transmitted from the communication unit 310 to a user terminal of the object person identified by the object person identification unit 302.

The evaluation processing unit 305 grants an evaluation corresponding to the impression of the gesture that has been identified by the meaning identification unit 303, to the object person identified by the object person identification unit 302, in association therewith, and stores the evaluation in the evaluation DB 330.

The communication unit 310 performs transmission and reception of data with an external device in a wired/wireless manner. For example, the communication unit 310 connects with the user terminal 1 via the network 4, and receives gesture information and position information.

In the gesture information storage unit 320, gestures and corresponding impressions as listed in Tables 1 and 2 described above are stored.

The evaluation DB 330 accumulates evaluation data of each user that has been processed by the evaluation processing unit 305.

The configurations of the respective devices included in the information processing system according to the present embodiment have been specifically described above. Subsequently, operation processing according to the present embodiment will be specifically described.

3. Operation Processing

3-1. First Example

Figure 6:
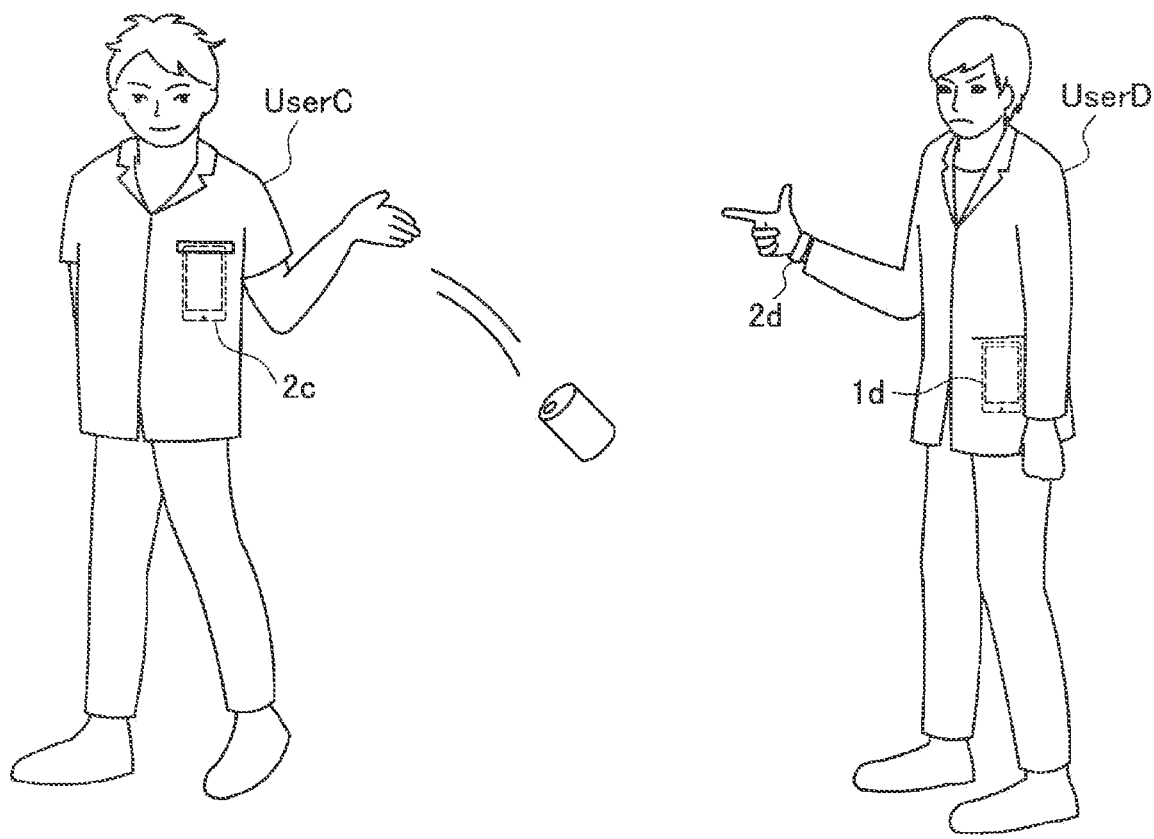
FIG. 6 is a diagram that describes a situation of a first example according to the present embodiment.

First of all, as a first example, a gesture performed in a case where an angry or warning feeling is desired to be conveyed to a person who is doing littering, and notification processing for other person will be described. FIG. 6 is a diagram that describes a situation of the first example according to the present embodiment. As illustrated in FIG. 6, an assumption will be made about a case in which, when a user D finds a user C who is doing littering, a feeling of anger to breach of manners, and a feeling of a desire to give warning are generated, and the user D performs a gesture of a finger pistol with a feeling of "No!", toward the user C.

In this example, the users C and D respectively carries user terminals 1c and 1d such as a smartphone, and a current position of each of the users can be recognized by a system side. In addition, the user D wears an wearable terminal 2 such as a SmartBand on his arm, and the gesture of the user D can be thereby recognized.

Operation processing according to this example will be described below with reference to FIGS. 7 to 8.

Figure 7:
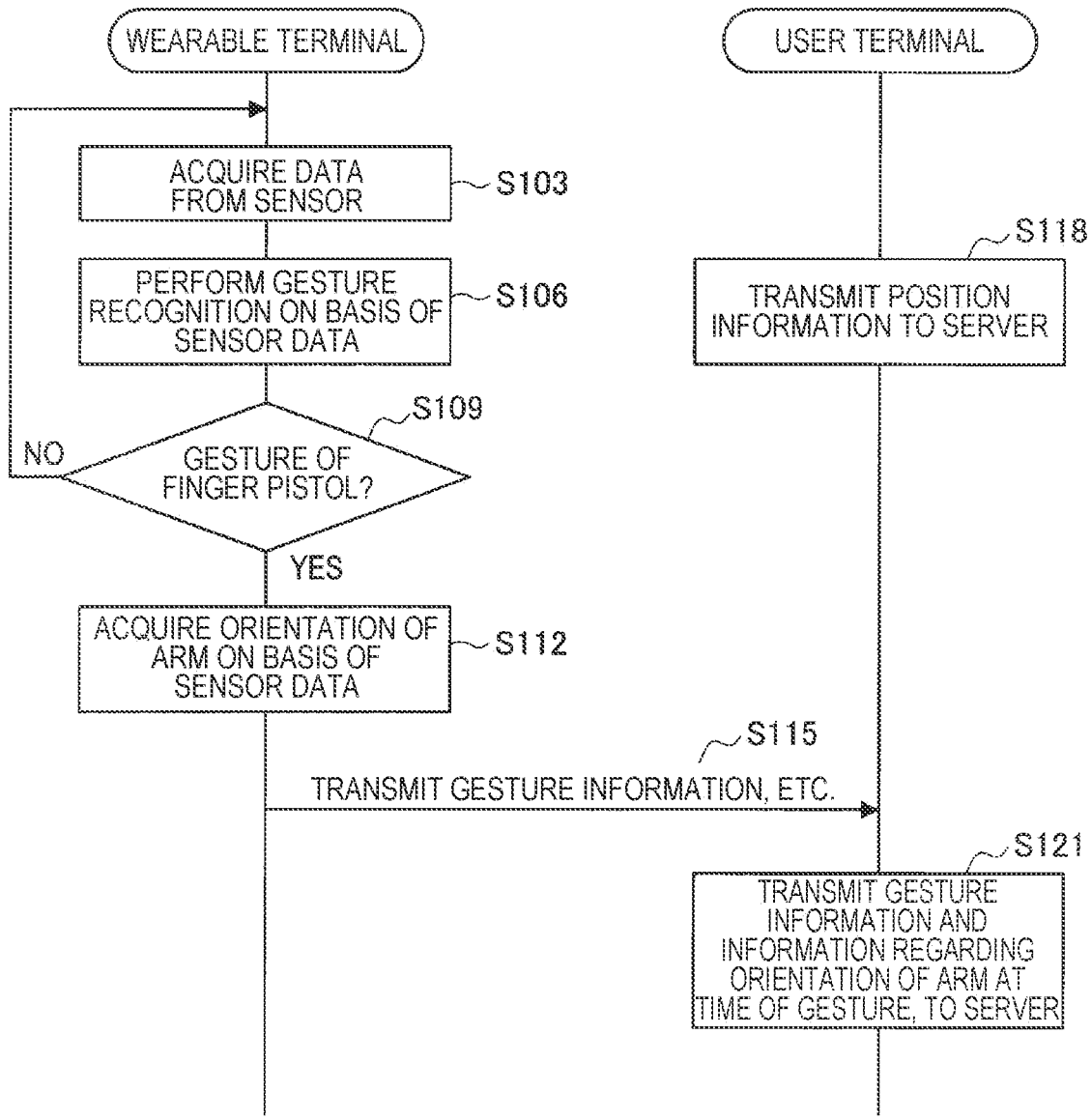
FIG. 7 is a sequence diagram illustrating operation processing of a user terminal and an wearable terminal according to the first example.

FIG. 7 is a sequence diagram illustrating operation processing of the user terminal 1 and the wearable terminal 2 according to the first example. As illustrated in FIG. 7, first of all, the wearable terminal 2 acquires sensor data from the sensor 220 (step S103).

Next, the gesture recognition unit 201 of the wearable terminal 2 performs gesture recognition on the basis of the sensor data (step S106). The gesture recognition unit 201 detects a specific gesture by an identification machine constructed in advance by machine learning, for example. Here, an operation of shooting with holding a finger pistol is detected as an example. It is assumed that, when the user D finds the user C who is doing littering, a feeling of anger to breach of manners, and a feeling of a desire to give warning are generated, and the user D performs a gesture of a finger pistol with a feeling of "No!", toward the user C. In this case, the gesture of the finger pistol is recognized by the sensor 220 of the wearable terminal 2 that the user D wears on his arm. More specifically, pistol-shaped fingers can be detected by, for example, myoelectric data detected by a myoelectric sensor. In addition, as an operation of holding a gun, a movement of swinging a lower arm down from above on an arc can be detected by an acceleration sensor or a gyro sensor.

After that, in a case where the gesture is recognized as the gesture of the finger pistol (step S109/Yes), the control unit 200 of the wearable terminal 2 acquires an orientation of an arm (direction to which the gesture is directed) on the basis of the sensor data (step S112). The acquisition of the orientation of the arm may be performed in a state in which the user holds a finger pistol, or in a case where it is recognized that a shooting gesture has been performed by a finger movement (detected by a myoelectric sensor) or speaking a shooting sound that sounds like "bang!" (collected by a microphone). The orientation of the arm can be acquired by a compass or a gyro sensor, for example.

After that, the wearable terminal 2 transmits a gesture recognition result and information indicating the orientation of the arm at the time, to the user terminal 1 (step S115).

On the other hand, the user terminal 1 continuously transmits position information to the server 3 (step S118).

After that, when the user terminal 1 receives the gesture information and the like from the wearable terminal 2, the user terminal 1 transmits the received gesture recognition result and information indicating the orientation of the arm, to the server 3 (step S121).

Subsequently, operation processing of the server 3 will be described with reference to FIG. 8.

Figure 8:
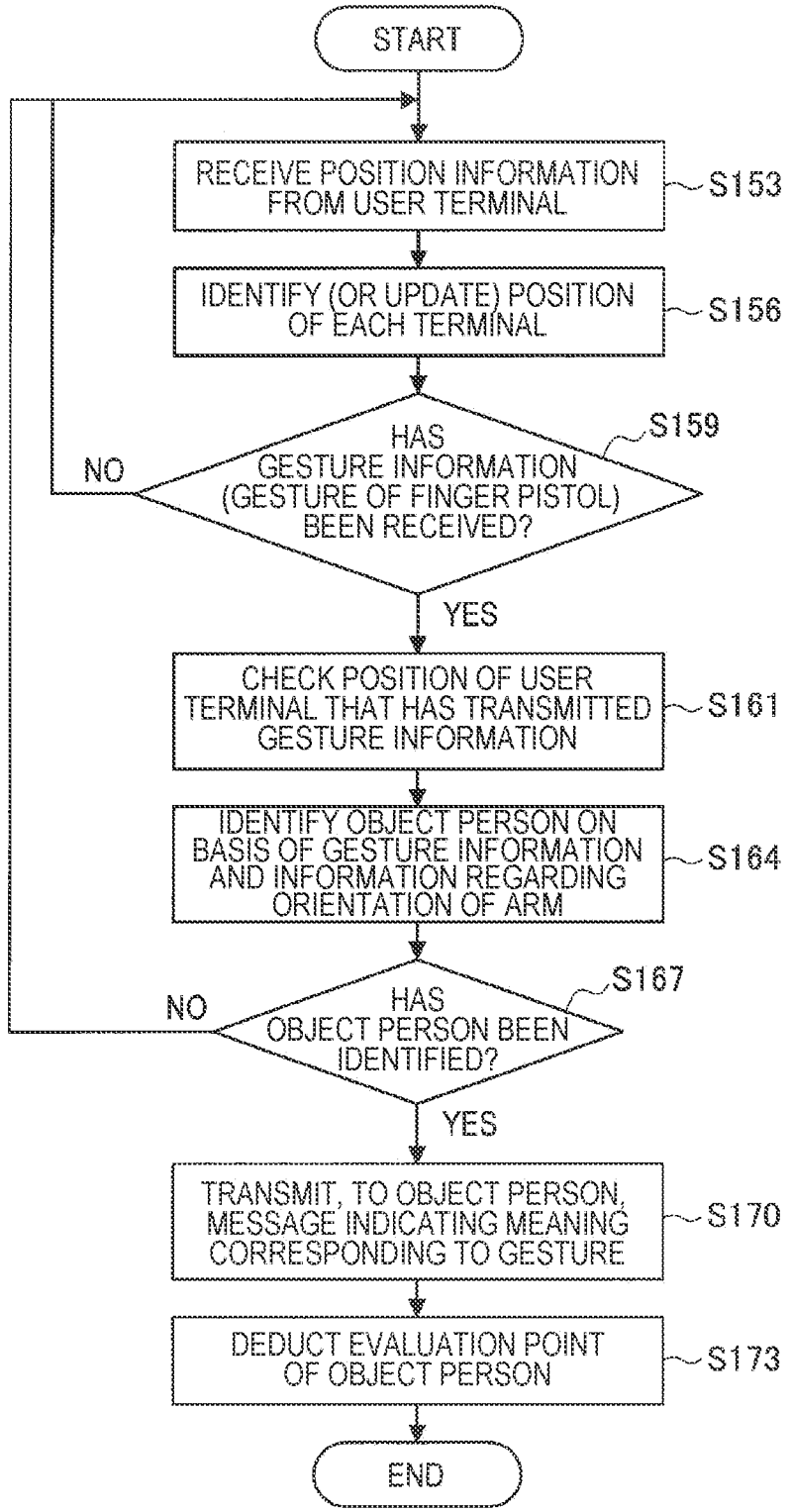
FIG. 8 is a flow chart illustrating operation processing of a server according to the first example.

As illustrated in FIG. 8, first of all, the server 3 continuously receives position information from each of the user terminals 1 (step S153), and identifies a current position of each user (each terminal) by the terminal position identification unit 301 (step S156).

Next, in a case where gesture information (in this example, gesture information of the finger pistol) has been received (step S159/Yes), the object person identification unit 302 of the server 3 checks a position of the user terminal 1 that has transmitted the gesture information (step S161).

After that, on the basis of the position of the user terminal 1 that has transmitted the gesture information, the direction of the arm, and current position information pieces of other recognized users, the object person identification unit 302 identifies an object person to which the user D has performed the gesture of shooting with a finger pistol (step S164). Here, an identification method of an object person will be described with reference to FIG. 9. As illustrated in FIG. 9, a position of each user is identified on a map on the basis of position information of a terminal. Here, on the basis of the direction of the arm that is set when the user D has shot with a finger pistol, the object person identification unit 302 searches for a person positioned in a direction of an arrow indicated by the direction of the arm that begins at the position of the user D, and identifies the user C as an object person. In addition, in a case where a plurality of persons exists in the direction of the arrow, a person existing at a position nearest to the user D may be identified. In addition, the direction of the arm that is set when the user D has shot with a finger pistol is not limited to a two-dimensional direction, and can include a three-dimensional direction. In addition, the position information may include height information.

Next, in a case where an object person has been identified (step S167/Yes), the server 3 transmits, to the object person, a message indicating a meaning corresponding to the gesture (step S170). For example, as a message indicating a meaning corresponding to the gesture of the finger pistol, a message indicating that "No! I will punish you." is transmitted to the user terminal 1c of the user C.

In addition, because the gesture of the finger pistol corresponds to a negative evaluation, the server 3 performs processing of deducting an evaluation point of the object person, by the evaluation processing unit 305 (step S173).

3-2. Second Example

Next, as a second example, a gesture performed in a case where a feeling representing affection is desired to be conveyed together with a message to other person in favor, and notification processing for the other person will be described. For example, an assumption will be made about a situation in which, when a person is drinking alone on a counter of a bar, in a case where another person of a favorite type is drinking alone in the middle distance, a message conveying affection is desired to be casually sent. Operation processing performed in such a situation will be described below with reference to FIGS. 10 to 11. Here, it is assumed that both of a user who performs a gesture, and other user have the user terminals 1. In addition, the user who performs a gesture wears the wearable terminal 2.

Figure 10:
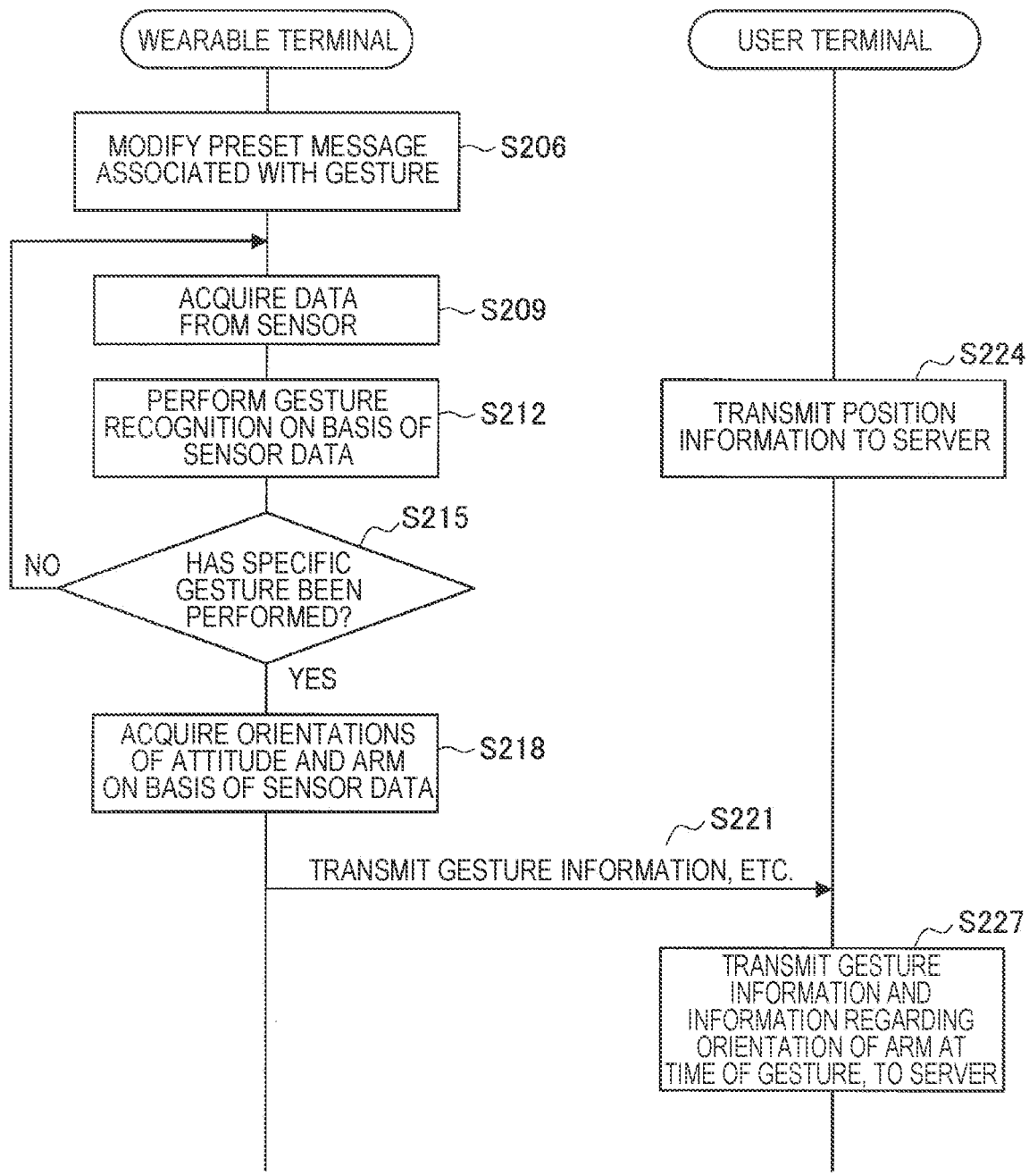
FIG. 10 is a sequence diagram illustrating operation processing of a user terminal and an wearable terminal according to a second example.

FIG. 10 is a sequence diagram illustrating operation processing of the user terminal 1 and the wearable terminal 2 according to the second example. As illustrated in FIG. 10, first of all, the wearable terminal 2 modifies a preset message associated with a gesture (step S206). The modification is not always essential. In a case where the user desires to change on the spot a message desired to be conveyed to the other person, the user can input a sound of a message by pressing a predetermined button of the wearable terminal 2, or modify a wording of the preset message by manipulating from the user terminal 1. The message input as a sound can be converted into a text message through speech recognition processing performed by the control unit 200.

After that, the wearable terminal 2 acquires sensor data from the sensor 220 (step S209).

Next, the gesture recognition unit 201 of the wearable terminal 2 performs gesture recognition on the basis of the sensor data (step S212). The gesture recognition unit 201 detects a specific gesture by an identification machine constructed in advance by machine learning, for example. Here, an operation indicating dearness such as a giving a look, a wink, and throwing a kiss is detected as an example. Giving a look and a wink can be detected by a SmartEyeglass put on a face, by detecting a movement of the face by a myoelectric sensor. In addition, throwing a kiss can be detected by detecting a movement of an arm by an acceleration sensor or a gyro sensor, and furthermore, collecting speech that sounds like "Chu", by a microphone.

After that, in a case where the gesture is recognized as a specific gesture (step S215/Yes), the control unit 200 of the wearable terminal 2 acquires an orientation of an attitude (body) and an orientation of an arm (both of the orientations are directions to which the gesture is directed) on the basis of the sensor data (step S218).

After that, the wearable terminal 2 transmits a gesture recognition result and information indicating the orientation of the arm at the time, and the like, to the user terminal 1 (step S221).

On the other hand, the user terminal 1 continuously transmits position information to the server 3 (step S224). The position information acquisition unit 120 of the user terminal 1 also has a function of indoor positioning using Wi-Fi, for example.

After that, when the user terminal 1 receives the gesture information and the like from the wearable terminal 2, the user terminal 1 transmits the received gesture recognition result and information indicating the orientation of the arm, to the server 3 (step S227).

Subsequently, operation processing of the server 3 will be described with reference to FIG. 11.

Figure 11:
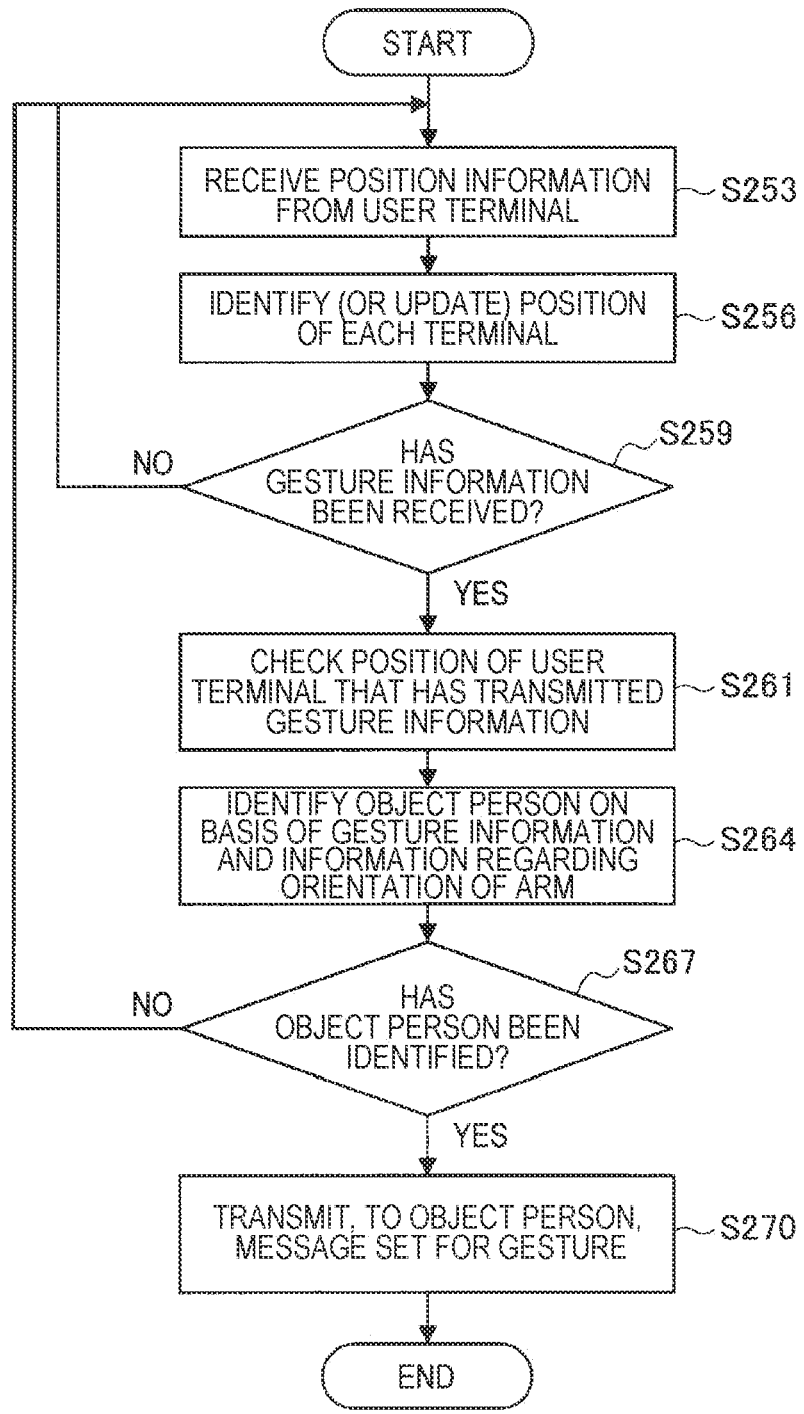
FIG. 11 is a flow chart illustrating operation processing of a server according to the second example.

As illustrated in FIG. 11, first of all, the server 3 continuously receives position information from each of the user terminals 1 (step S253), and identifies a current position of each user (each terminal) by the terminal position identification unit 301 (step S256).

Next, in a case where gesture information has been received (step S259/Yes), the object person identification unit 302 of the server 3 checks a position of the user terminal 1 that has transmitted the gesture information (step S261).

After that, on the basis of the position of the user terminal 1 that has transmitted the gesture information, the direction of the arm, and current position information pieces of other recognized users, the object person identification unit 302 identifies an object person to which the user has performed a specific gesture (e.g., wink, hand beckoning, throwing a kiss, or the like) (step S264).

Next, in a case where an object person has been identified (step S267/Yes), the server 3 transmits, to the object person, a text message associated with the gesture, that is, a preset text message, or a text message modified by the user (step S270).

3-3. Third Example

The information processing system according to the present embodiment may be performed between users preregistered in this service. For example, when a message is transmitted to an identified other user, a transmission destination needs to be identified on the server 3 side, but as for the users preregistered in this service, registered addresses can be used.

In addition, when an object person is identified on the basis of a direction to which a gesture is directed, for preventing another person from being erroneously identified, not a person existing in a remote location on the indicated direction is identified, but a person existing in a range limited to a visible range of the person who has performed the gesture is identified. Thus, positions of a plurality of persons in a confined range need to be accurately recognized.

Thus, by targeting the users preregistered in this service, a destination can be preliminarily recognized, and in addition, a permission of provision of detailed position information can be preliminarily received.

Operation processing performed on the server 3 side according to the third example will be described below with reference to FIG. 12. Note that gesture recognition processing performed on the user side is similar to that in the first and second examples. Thus, the description will be omitted here.

Figure 12:
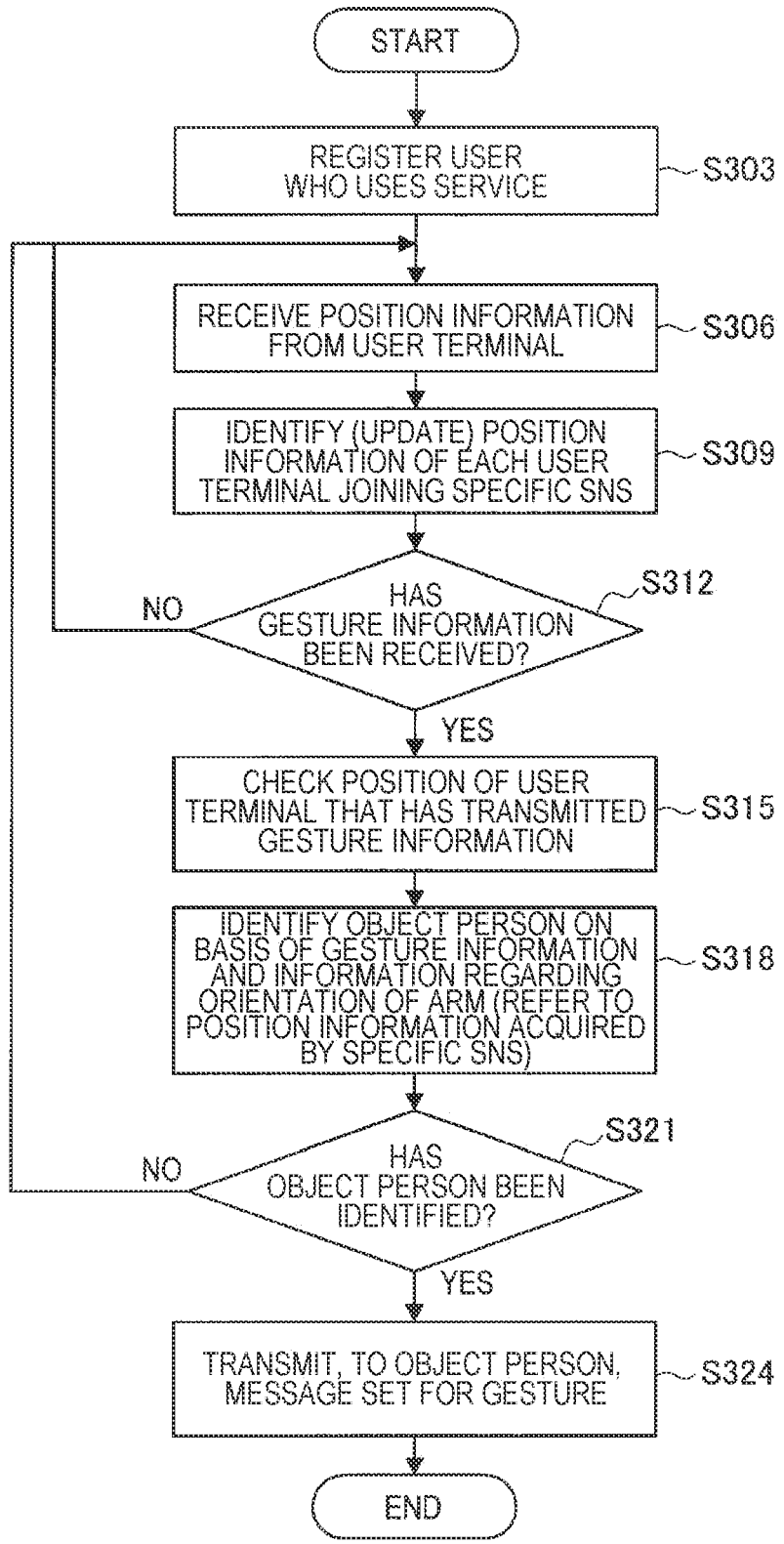
FIG. 12 is a flow chart illustrating operation processing of a server according to a third example.

As illustrated in FIG. 12, first of all, the control unit 300 of the server 3 performs registration of a user who uses the service (step S303). More specifically, for example, together with the registration of a user ID and a terminal ID, the control unit 300 obtains a provision permission of detailed position information, a provision permission of address information, and a provision permission of action history information, for the use of this service. Hereinafter, a user registered by obtaining these permissions will be referred to as a user who has joined a specific SNS.

After that, the server 3 continuously receives position information from each of the user terminals 1 (step S306), and identifies a current position of each user (each terminal) joining a specific SNS, by the terminal position identification unit 301 (step S309).

Next, in a case where gesture information has been received (step S312/Yes), the object person identification unit 302 of the server 3 checks a position of the user terminal 1 that has transmitted the gesture information (step S315).

After that, on the basis of the position of the user terminal 1 that has transmitted the gesture information, the direction of the arm, and current position information pieces of other users recognized by the specific SNS, the object person identification unit 302 identifies an object person to which the user has performed a specific gesture (step S318).

Next, in a case where an object person has been identified (step S321/Yes), the server 3 transmits, to the object person, a message associated with the gesture (step S324).

4. Application Example

Figure 13:
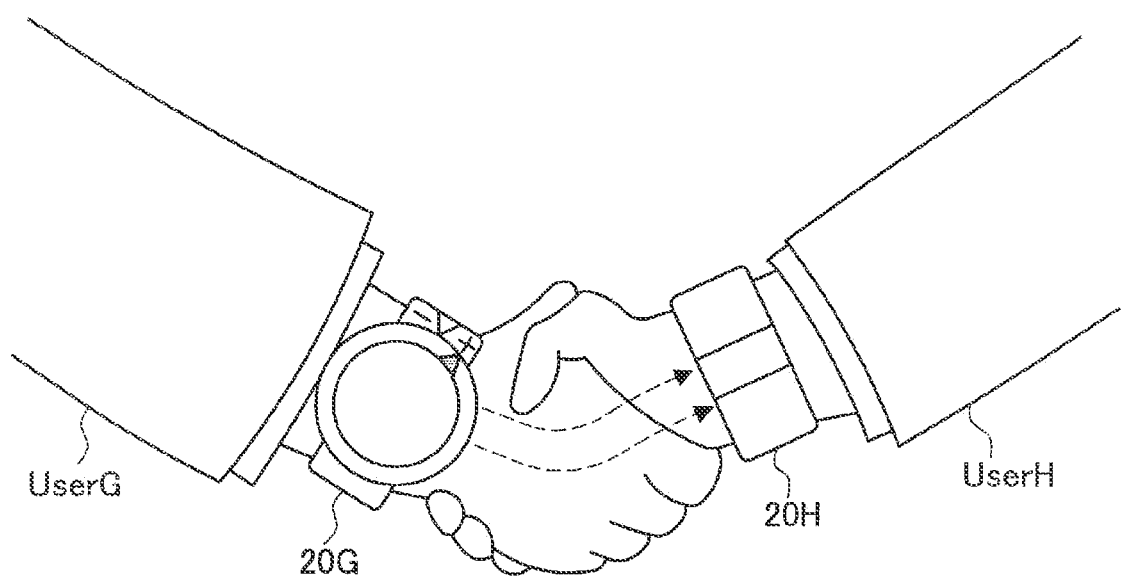
FIG. 13 is a diagram that describes a situation according to an application example of the present embodiment.

Subsequently, an information processing system according to an application example of the present embodiment will be described with reference to FIGS. 13 to 15. In the aforementioned embodiment, gesture information detected by the wearable terminal 2 is transmitted from the user terminal 1 to the server 3 on a network, and notification processing control is performed mainly in the server 3. Nevertheless, the present embodiment is not limited to this, and direct communication can be performed between wearable terminals. For example, as illustrated in FIG. 13, when users G and H perform a handshake gesture involving a contact, quasi-electrostatic field communication is performed by respectively-worn wearable terminals 20G and 20H, and a positive evaluation corresponding to the handshake gesture is transmitted from one wearable terminal 20 to the other wearable terminal 20. With this configuration, when a handshake is performed, a further stronger thought can be conveyed. Note that whether to perform the transmission of a positive evaluation using the quasi-electrostatic field communication can be set by a switch (knob) provided in the wearable terminal 20G as illustrated in FIG. 13. When the transmission of an evaluation corresponding to a gesture is performed, the knob is turned to a "+" side.

Figure 14:
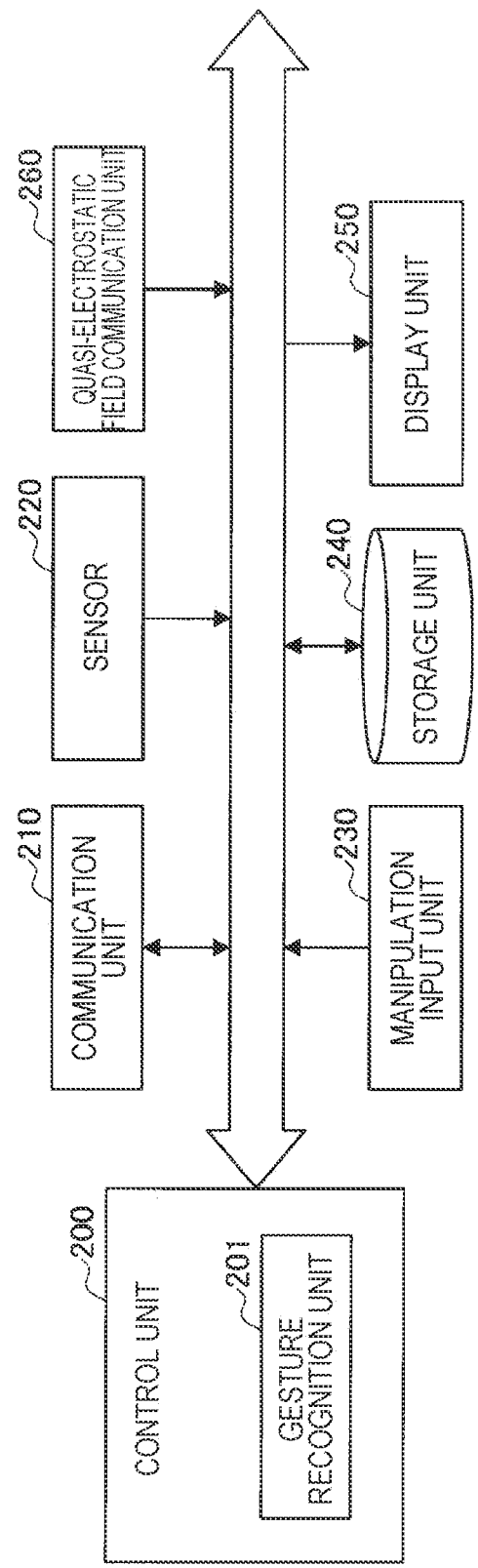
FIG. 14 is a diagram illustrating a configuration example of an wearable terminal according to the application example of the present embodiment.

Here, a configuration example of the wearable terminal 20 according to this application example is illustrated in FIG. 14. As illustrated in FIG. 14, the wearable terminal 20 includes the control unit 200, the communication unit 210, the sensor 220, the manipulation input unit 230, the storage unit 240, the display unit 250, and a quasi-electrostatic field communication unit 260.

The quasi-electrostatic field communication unit 260 is a human body communication system that performs data communication through an electrical field formed by the interposition of human bodies. In the quasi-electrostatic field communication, for example, a sound signal such as music, a coded signal, and the like can be communicated through a contact of human bodies.

Because the other configurations are similar to the respective configurations of the aforementioned wearable terminal 2, the description will be omitted here.

Subsequently, operation processing according to this application example will be described with reference to FIG. 15.

As illustrated in FIG. 15, first of all, the wearable terminal 20 checks whether a switch is turned ON, as for the availability of the transmission of a feeling corresponding to a gesture (step S403). More specifically, for example, the wearable terminal 20 checks whether the knob is put in plus as illustrated in FIG. 13.

After that, in a case where the switch is turned ON (step S403/Yes), the wearable terminal 2 acquires sensor data from the sensor 220 (step S406).

Next, the gesture recognition unit 201 of the wearable terminal 2 performs gesture recognition on the basis of the sensor data (step S409). The gesture recognition unit 201 detects a specific gesture by an identification machine constructed in advance by machine learning, for example. In this example, an operation of performing handshake is detected. More specifically, for example, the gesture recognition unit 201 recognizes a handshake operation by myoelectrically detecting that hands are held, and detecting, from data of an acceleration sensor or a gyro sensor, that a vertical movement is repeated at a predetermined speed with the hands being held.

After that, in a case where it is recognized that the handshake has been performed (step S412/Yes), the control unit 200 of the wearable terminal 2 detects quasi-electrostatic field communication of a terminal of other person by the quasi-electrostatic field communication unit 260 (step S415). By detecting the quasi-electrostatic field communication of the terminal of the other person, the control unit 200 can check that the user has a contact with the human body of the other person, and can recognize more accurately that quasi-electrostatic field communication can be performed with the terminal of the other person, and in addition, that the user is not simply moving the hand, but the user is shaking hands with holding hands with the other person. Furthermore, by identifying the terminal of the other person, the control unit 200 can also recognize with who the user is shaking hands.

Then, when the quasi-electrostatic field communication of the terminal of the other person is detected (step S415/Yes), the control unit 200 performs control so that information regarding a positive evaluation on the other person that is associated with the handshake gesture in advance is transmitted to the terminal of the other person using the quasi-electrostatic field communication (step S418). An impression such as an evaluation and a message that are associated with a gesture may be stored in the storage unit 240.

Note that, in this application example, an example of the handshake gesture has been described, but the present embodiment is not limited to this. For example, also in another gesture involving a contact (e.g., hug, massaging shoulders, slipping an arm around a waist, hug and tapping a back, high touch, etc.), an impression associated with each gesture can be transmitted to the terminal of the other person using the quasi-electrostatic field communication.

In addition, in this application example, the description has been given of an example of transmitting an impression associated with a gesture, such as a positive evaluation, to the terminal of the other person using the quasi-electrostatic field communication. Nevertheless, the present embodiment is not limited to this, and the impression may be transmitted to the terminal of the other person via a cloud using a communication line of an wearable terminal, or may be transmitted using Near Field Communication such as Bluetooth and infrared communication.

5. Conclusion

As mentioned above, in the information processing system according to the embodiment of the present disclosure, an impression can be notified to a specific other person by means of gestures.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, a ROM, and a RAM that is built in the aforementioned user terminal 1, the wearable terminal 2, or the server 3, to execute a function of the user terminal 1, the wearable terminal 2, or the server 3 can also be created. In addition, a computer-readable storage medium storing the computer program is also provided.

In addition, the gesture recognition unit 201 is provided in the wearable terminal 2, but the present embodiment is not limited to this, and gesture recognition processing may be performed in the user terminal 1 or the server 3.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication system including:
a recognition unit configured to recognize whether a user is performing a specific gesture; and
a control unit configured to
identify a client serving as a communication destination, when the specific gesture is recognized,
identify an impression represented by recognized gesture information, and
perform control such that the impression represented by the gesture information is notified to a user corresponding to the client.

(2)

The communication system according to (1), further including
a quasi-electrostatic field communication unit,
in which, when the specific gesture is recognized, the control unit identifies whether or not there is a client serving as a communication destination capable of performing quasi-electrostatic field communication on a periphery, and performs control such that the impression represented by the gesture information is transmitted to a user corresponding to the identified client via the quasi-electrostatic field communication unit.

(3)

The communication system according to (1), including
a communication unit configured to communicate with a server configured to manage a message transmitted and received between users,
in which the control unit performs control such that the impression represented by the gesture information is transmitted to the user corresponding to the client, via the communication unit and the server.

(4)

The communication system according to any one of (1) to (3), further including
a sound input unit,
in which the control unit is capable of changing the impression represented by the gesture information to a message obtained by converting a sound input by the sound input unit.

(5)

The communication system according to any one of (1) to (4), including:
a client including
the recognition unit configured to recognize whether a user is performing a specific gesture,
a client control unit configured to generate, when the specific gesture is recognized, position information indicating a position of the client, and direction information indicating a direction pointed out by the user, and a client communication unit configured to transmit, to a server, gesture information indicating the specific gesture, the position information, and the direction information; and a server including a server communication unit configured to receive, from a plurality of clients, position information indicating respective positions, the control unit, and a server control unit configured to, when the gesture information is received via the server communication unit, identify a client pointed out by the user, in accordance with the position information corresponding to a client that has transmitted the gesture information, and the direction information that have been acquired via the server communication unit, and performs control such that an impression represented by the gesture information is notified to a user corresponding to the client.

(6)

The communication system according to (5), in which the server control unit holds a table in which gesture information and an impression are associated, and identifies an impression represented by the gesture information in accordance with the table.

(7)

The communication system according to (5) or (6), in which the server control unit manages a position of a client corresponding to a user registered in a specific messaging service, and a destination of the user, identifies the managed client pointed out by the user, in accordance with the position information corresponding to a client that has transmitted the gesture information, and the direction information that have been acquired via the server communication unit, and performs control such that an impression represented by the gesture information is notified to a destination of a user corresponding to the client.

(8)

The communication system according to any one of (5) to (7), in which the server control unit updates an evaluation of the user in accordance with the gesture information.

(9)

The communication system according to any one of (5) to (7), in which the server control unit performs control such that a message corresponding to the gesture information is transmitted to the user.

(10)

A server including:

a communication unit configured to receive, from a plurality of clients, position information indicating respective positions; and a control unit configured to when gesture information indicating that a user corresponding to a specific client is performing a specific gesture, and direction information of a gesture are received via the communication unit, identifies a client pointed out by the user, in accordance with the position information corresponding to a client that has transmitted the gesture information, and the direction information that have been acquired via the communication unit, and performs control such that an impression represented by the gesture information is notified to a user corresponding to the client.

(11)

The server according to (10), in which the control unit holds a table in which gesture information and an impression are associated, and identifies an impression represented by the gesture information in accordance with the table.

(12)

The server according to (10) or (11), in which the control unit manages a position of a client corresponding to a user registered in a specific messaging service, and a destination of the user, identifies the managed client pointed out by the user, in accordance with the position information corresponding to a client that has transmitted the gesture information, and the direction information that have been acquired via the communication unit, and performs control such that an impression represented by the gesture information is notified to a destination of a user corresponding to the client.

(13)

The server according to any one of (10) to (12), in which the control unit updates an evaluation of the user in accordance with the gesture information.

(14)

The server according to any one of (10) to (13), in which the control unit performs control such that a message corresponding to the gesture information is transmitted to the user.

(15)

A storage medium storing a program for causing a computer to function as:

a recognition unit configured to recognize whether a user is performing a specific gesture; and a control unit configured to identify a client serving as a communication destination, when the specific gesture is recognized, identify an impression represented by the recognized gesture information, and perform control such that the impression represented by the gesture information is notified to a user corresponding to the client.

(16)

A communication control method including:

by a processor, receiving, from a plurality of clients, position information indicating respective positions via a communication unit;

when gesture information indicating that a user corresponding to a specific client is performing a specific gesture, and direction information of a gesture are received via the communication unit;

identifying a client pointed out by the user, in accordance with the position information corresponding to a client that has transmitted the gesture information, and the direction information that have been acquired via the communication unit; and performing control such that an impression represented by the gesture information is notified to a user corresponding to the client.

REFERENCE SIGNS LIST

1 user terminal
100 control unit
110 communication unit
120 position information acquisition unit
130 camera
140 microphone 150 manipulation input unit
160 storage unit
170 display unit
180 speaker
2 wearable terminal
200 control unit
210 communication unit
220 sensor
230 manipulation input unit
240 storage unit
250 display unit
3 server
300 control unit
310 communication unit
320 gesture information storage unit
330 evaluation DB

The invention claimed is:

1. A communication system, comprising:
first circuitry configured to:
recognize a specific gesture of a first user to obtain gesture information, wherein
a first client device corresponds to the first user, and
the specific gesture of the first user is based on a specific action of a second user;
generate position information that indicates a position of the first client device and a height of the first user, and direction information that indicates a specific direction pointed out by the specific gesture of the first user; and
transmit the position information, the direction information, and the gesture information, wherein the gesture information indicates the specific gesture.

2. The communication system according to claim 1, wherein the position information, the direction information, and the gesture information are transmitted to a server.

3. The communication system according to claim 1, wherein the first circuitry is further configured to recognize the specific gesture of the first user based on a sound input by a sound input device.

4. The communication system according to claim 1, wherein the first circuitry is further configured to execute quasi-electrostatic field communication based on the recognition of the specific gesture.

5. The communication system according to claim 1, further comprising a server that includes second circuitry.

6. The communication system according to claim 5, wherein the second circuitry is configured to:
receive the position information, the direction information, and the gesture information; and
identify a second client device based on the position information, the direction information, and the gesture information.

7. The communication system according to claim 6, wherein the second circuitry is further configured to control transmission of a message corresponding to the gesture information to the second client device.

8. The communication system according to claim 7, wherein
the second client device is pointed out by the first user, and
the second client device corresponds to the second user.

9. The communication system according to claim 8, wherein
the second circuitry is further configured to identify an impression represented by the gesture information, and
the identified impression indicates an evaluation of the second user.

10. The communication system according to claim 9, wherein the second circuitry is further configured to control transmission of a notification of the identified impression to the second client device.

11. A communication method, comprising:
in a communication system:
recognizing a specific gesture of a first user to obtain gesture information, wherein
a client device corresponds to the first user, and
the specific gesture of the first user is based on a specific action of a second user;
generating position information indicating a position of the client device and a height of the first user, and direction information indicating a specific direction pointed out by the specific gesture of the first user; and
transmitting the position information, the direction information, and the gesture information, wherein the gesture information indicates the specific gesture.

12. The communication method according to claim 11, wherein the position information, the direction information and the gesture information are transmitted to a server.

* * * * *